(12) United States Patent
Aso

(10) Patent No.: US 10,024,470 B2
(45) Date of Patent: Jul. 17, 2018

(54) FUEL TANK FUELING PORTION STRUCTURE

(71) Applicant: TOYOTA JIDOSHA KABUSHIKI KAISHA, Toyota-shi, Aichi-ken (JP)

(72) Inventor: Shuichi Aso, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 241 days.

(21) Appl. No.: 14/832,190

(22) Filed: Aug. 21, 2015

(65) Prior Publication Data

US 2016/0069492 A1 Mar. 10, 2016

(30) Foreign Application Priority Data

Sep. 10, 2014 (JP) ................. 2014-184527

(51) Int. Cl.
*B60K 15/04* (2006.01)
*F16L 29/00* (2006.01)
*F16L 29/02* (2006.01)

(52) U.S. Cl.
CPC ............ *F16L 29/007* (2013.01); *B60K 15/04* (2013.01); *F16L 29/02* (2013.01); *B60K 2015/0461* (2013.01); *Y10T 137/8242* (2015.04)

(58) Field of Classification Search
CPC ........ F16L 29/007; F16L 29/02; B60K 15/04; B60K 2015/0461; B60K 2015/0419; B60K 2015/0458; B60K 2015/0483; B60K 2015/0422; B60K 2015/0429; B60K 2015/0454; F16K 31/56; F16K 31/563; B65B 3/18; B65B 1/04; Y10T 137/7761; Y10T 137/8242

USPC .............. 251/60, 67, 74, 68, 251, 301, 302; 141/350; 220/86.2; 137/487.5, 554
See application file for complete search history.

(56) References Cited

U.S. PATENT DOCUMENTS

| 5,533,766 A | 7/1996 | Farber |
| 5,791,387 A | 8/1998 | Palvolgyi |
| 2007/0125444 A1 | 6/2007 | Hagano et al. |
| 2010/0147404 A1 | 6/2010 | Runarvot et al. |

(Continued)

FOREIGN PATENT DOCUMENTS

| DE | 19638162 A1 | 3/1997 |
| JP | H06-206457 A | 7/1994 |
| JP | 2007-046464 A | 2/2007 |

(Continued)

*Primary Examiner* — Craig J Price
*Assistant Examiner* — Andrew J Rost
(74) *Attorney, Agent, or Firm* — Oliff PLC

(57) ABSTRACT

A fuel tank fueling portion structure includes: a fueling pipe that is in fluid communication with a fuel tank, the fueling pipe being provided with a fueling opening; a lid that is openably and closably provided at a vehicle body, the lid in a closed state covering the fueling opening from a vehicle body outer side; an on-off valve that is provided at a flow channel inside the fueling pipe and closes off the flow channel, the on-off valve opening up the flow channel when pressed by the fueling nozzle; and a valve retention device that is provided in the fueling pipe, the valve retention device retaining an open state of the on-off valve that has been opened by pressing from the fueling nozzle, and releasing the retention of the open state of the on-off valve when the lid goes into a closed state.

3 Claims, 14 Drawing Sheets

(56) References Cited

U.S. PATENT DOCUMENTS

2012/0031508 A1* 2/2012 Schmidt .......... B60K 15/03504
137/312
2013/0340866 A1 12/2013 Sasaki

FOREIGN PATENT DOCUMENTS

| JP | 2007-153049 A | 6/2007 |
| JP | 2012-162165 A | 8/2012 |
| JP | 2013-071683 A | 4/2013 |
| WO | 2008/055895 A1 | 5/2008 |

* cited by examiner

FUEL TANK FUELING PORTION STRUCTURE

CROSS-REFERENCE TO RELATED APPLICATION

This application is based on and claims priority under 35 USC 119 from Japanese Patent Application No. 2014-184527 filed on Sep. 10, 2014, the disclosure of which is incorporated by reference herein.

BACKGROUND

Technical Field

The present invention relates to a fueling portion structure of a fuel tank.

Related Art

Japanese Patent Application Laid-Open (JP-A) No. 2012-162165 has disclosed a fueling portion structure that is provided with an on-off valve on a flow channel inside a fueling pipe that is for fueling a fuel tank, which on-off valve opens the flow channel when pressed by a fueling nozzle.

However, with the fueling portion structure disclosed in JP-A No. 2012-162165, the on-off valve closes off the flow channel when the fueling nozzle is pulled out from inside the fueling pipe. Hence, if fuel falls from the fueling nozzle, the fuel may collect on the on-off valve.

SUMMARY

In consideration of the circumstances described above, an object of an aspect of the present invention is to provide a fuel tank fueling portion structure in which fuel is unlikely to collect on an on-off valve.

A fuel tank fueling portion structure according to a first aspect of the present invention includes: a fueling pipe that is in fluid communication with a fuel tank, the fueling pipe being provided with a fueling opening at which a fueling nozzle can be inserted; a lid that is openably and closably provided at a vehicle body, the lid in a closed state covering the fueling opening from a vehicle body outer side; an on-off valve that is provided at a flow channel inside the fueling pipe and closes off the flow channel, the on-off valve opening up the flow channel when pressed by the fueling nozzle; and a valve retention device that is provided in the fueling pipe, the valve retention device retaining an open state of the on-off valve that has been opened by pressing from the fueling nozzle, and releasing the retention of the open state of the on-off valve when the lid goes into a closed state.

In the fuel tank fueling portion structure according to the first aspect, after the lid is opened, when the fueling nozzle is inserted through the fueling opening and presses against the on-off valve, the flow channel in the fueling pipe is opened up and fueling into the fuel tank is enabled.

In this fuel tank fueling portion structure, the opening state of the on-off valve is maintained by the valve retention device until the lid is put into the closed state thereof. Therefore, even if fuel falls from the fueling nozzle when the fueling nozzle is being pulled out, the fuel is unlikely to collect on the on-off valve.

In a fuel tank fueling portion structure according to a second aspect of the present invention, in the fuel tank fueling portion structure of the first aspect, the valve retention device includes: a retention member provided with a valve retention portion that abuts against the opened on-off valve and retains the open state of the on-off valve; a movement device that moves the valve retention portion from an abutting position, at which the valve retention portion abuts against the on-off valve, toward a withdrawn position, at which the valve retention portion does not abut against the on-off valve; and a control device that controls the movement device and moves the valve retention portion toward the withdrawn position when the lid goes into the closed state.

In the fuel tank fueling portion structure according to the second aspect, when the lid is put into the closed state, the control device controls the movement device to move the valve retention portion from the abutting position to the withdrawn position. As a result, the retention of the open state of the on-off valve is released.

Thus, the retention of the open state of the on-off valve may be released by a simple structure in which the movement device is controlled by the control device and moves the valve retention portion.

In a fuel tank fueling portion structure according to a third aspect of the present invention, in the fuel tank fueling portion structure of the second aspect, the valve retention device further includes an urging member that urges the valve retention portion toward the abutting position.

In the fuel tank fueling portion structure according to the third aspect, because the valve retention portion is urged toward the abutting position by the urging member, the open state of the on-off valve may be reliably retained.

In a fuel tank fueling portion structure according to a fourth aspect of the present invention, in the fuel tank fueling portion structure of the second aspect, the retention member is turnably supported by the movement device, and the movement device turns the retention member and moves the valve retention portion from the abutting position toward the withdrawn position.

In the fuel tank fueling portion structure according to the fourth aspect, because the retention member is turned by the movement device to move the valve retention portion from the abutting position to the withdrawn position, a duration in which the valve retention portion moves from the abutting portion to the withdrawn position may be adjusted by adjustment of a rotary speed of the retention member. Thus, the duration in which the valve returns from the open state to the closed state may be adjusted. Therefore, even if a distal end of the fueling nozzle is touched against the fueling opening and fuel drains out, the fuel is less likely to collect on the on-off valve than in, for example, a structure in which a duration in which an on-off valve returns from the open state to the closed state cannot be adjusted.

The fuel tank fueling portion structure according to the first aspect of the present invention provides an excellent effect in that fuel is unlikely to collect on the on-off valve.

The fuel tank fueling portion structure according to the second aspect of the present invention provides an excellent effect in that the retention of the open state of the on-off valve may be released with a simple structure.

The fuel tank fueling portion structure according to the third aspect of the present invention provides an excellent effect in that the open state of the on-off valve may be retained reliably.

The fuel tank fueling portion structure according to the fourth aspect of the present invention provides an excellent effect in that fuel is unlikely to collect on the on-off valve even if a distal end of a fueling nozzle is touched against the fueling opening and fuel drains out.

BRIEF DESCRIPTION OF THE DRAWINGS

Exemplary embodiments of the present invention will be described in detail based on the following figures, wherein.

DETAILED DESCRIPTION

Figure 1:
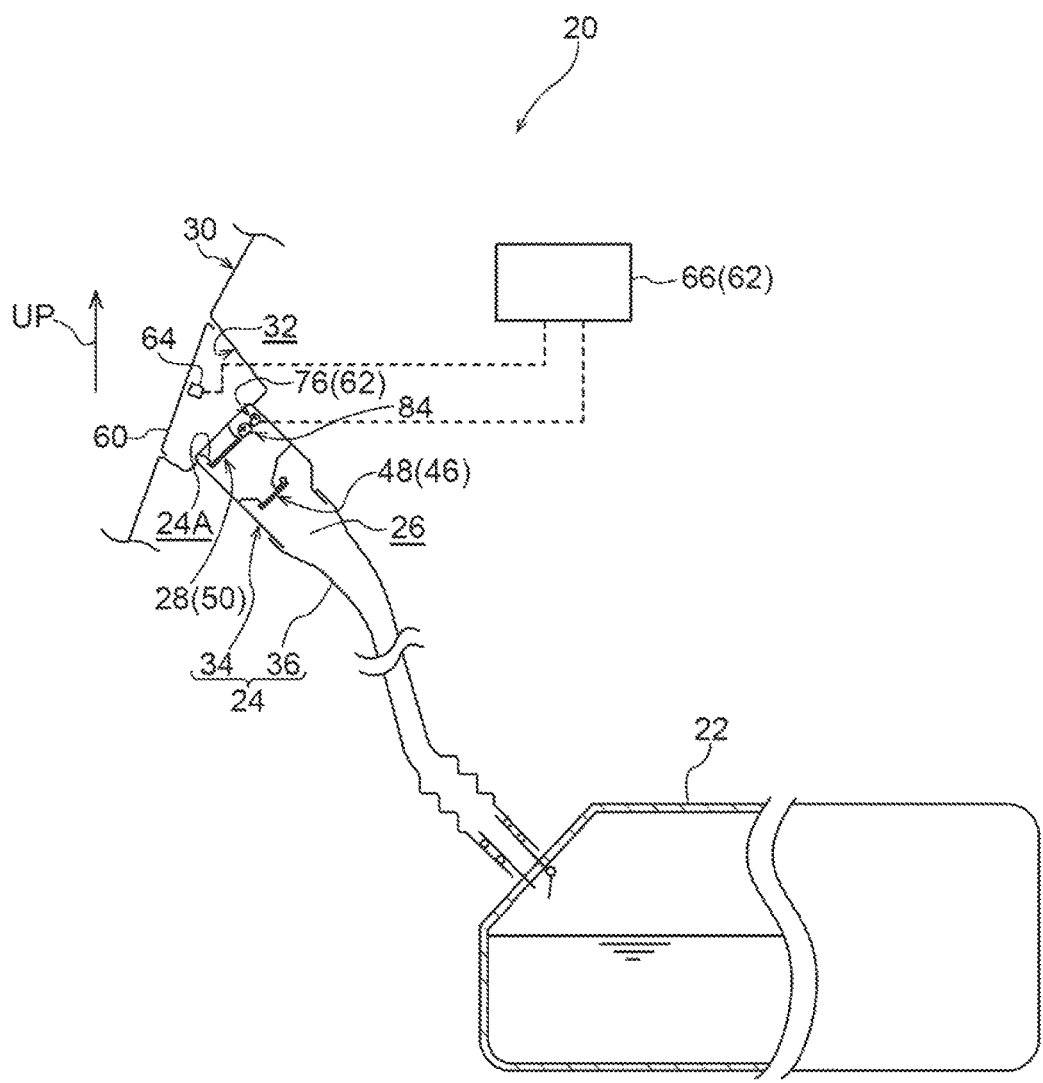
FIG. 1 is a schematic structural diagram of a fuel tank employing a fuel tank fueling portion structure in accordance with a first exemplary embodiment of the present invention.

Herebelow, a fueling portion structure of a fuel tank according to a first exemplary embodiment of the present invention is described.

First Exemplary Embodiment

Below, a fuel tank fueling portion structure (hereinafter referred to simply as "the fueling portion structure") 20 according to the first exemplary embodiment of the present invention is described with reference to FIG. 1 to FIG. 9. The arrow UP that is shown as appropriate in the drawings indicates a vehicle upward direction, and the arrow X indicates a direction of insertion of a fueling nozzle 100, which is described below.

As shown in FIG. 1, the fueling portion structure 20 according to the present exemplary embodiment is provided with a fueling opening 24A at which the fueling nozzle 100 is inserted. The fueling portion structure 20 includes a filler pipe 24 and an outer side cover 28. The filler pipe 24 is in fluid communication with a fuel tank 22 and delivers fuel supplied from the fueling nozzle 100 to the fuel tank 22. The outer side cover 28 is provided at a flow channel 26 inside the filler pipe 24, closes off the flow channel 26, and opens up the flow channel 26 when pressed against by a distal end portion of the fueling nozzle 100. The filler pipe 24 according to the present exemplary embodiment is an example of a fueling pipe of the present invention, and the outer side cover 28 according to the present exemplary embodiment is an example of an on-off valve of the present invention.

In the present exemplary embodiment, where simply "the near side" is referred to, this term means a near side of the filler pipe 24, which is to say the side of the filler pipe 24 at which the fueling opening 24A is provided. Where simply "the far side" is referred to, this term means a far side of the filler pipe 24, which is to say the side of the filler pipe 24 at which the fuel tank 22 is disposed. Where simply "the diametric direction" is referred to, this term means a diametric direction of the filler pipe 24, and where simply "the axial direction" is referred to, this term means an axial direction of the filler pipe 24.

An upper end portion of the filler pipe 24 is attached to a floor portion of a recess portion 32. The recess portion 32 is formed in an outer panel that structures a vehicle body 30, and is recessed to the vehicle body inner side. A lower end portion of the filler pipe 24 is connected to an upper portion of the fuel tank 22.

Figure 2:
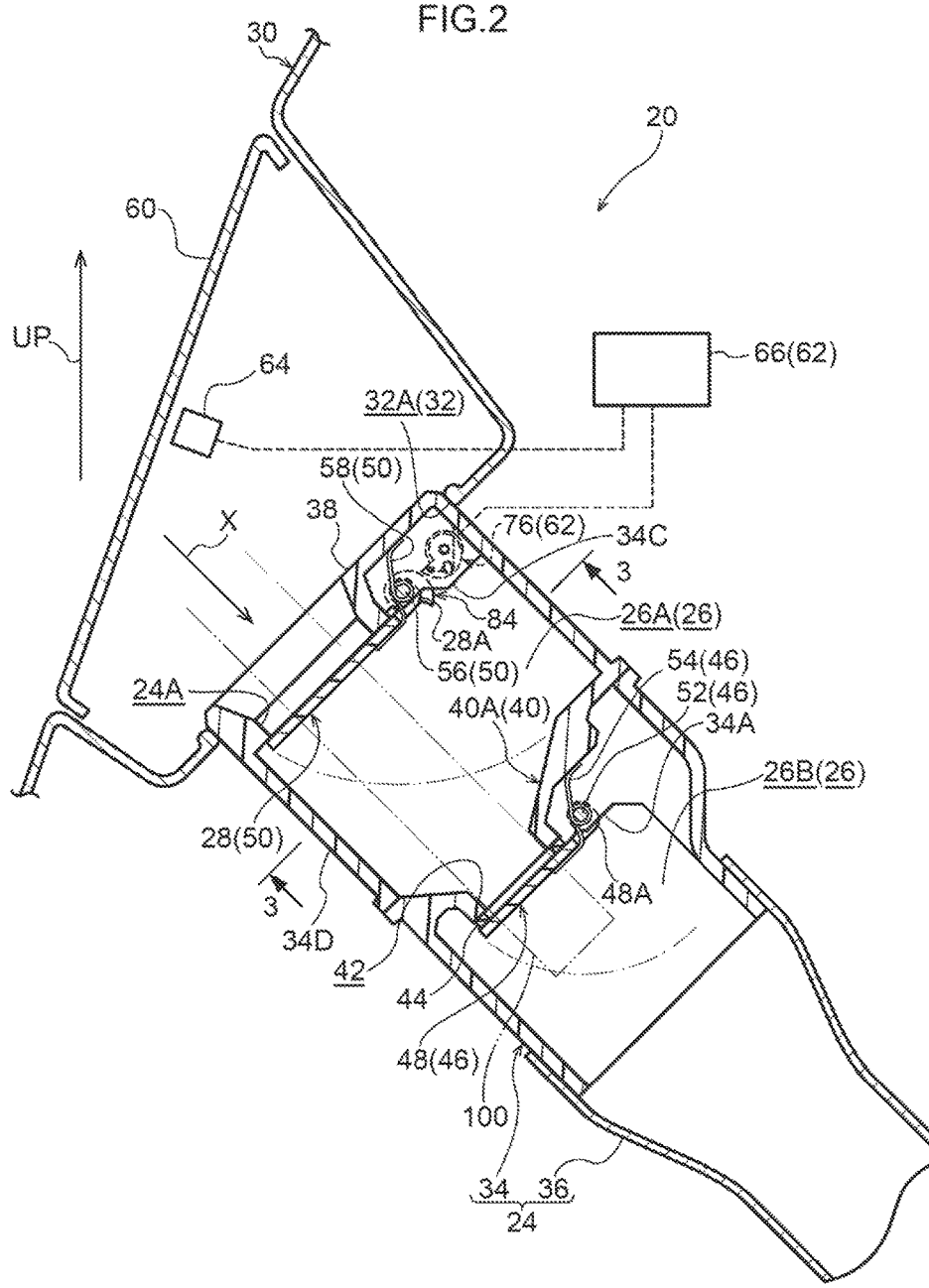
FIG. 2 is a sectional diagram cut along an axial direction of a fueling pipe that is used at the fuel tank fueling portion structure in accordance with the first exemplary embodiment.

As shown in FIG. 2, the filler pipe 24 is provided with a fueling opening member 34 in a tubular shape and a pipe main body 36 in a tubular shape. The fueling opening member 34 structures the fueling opening 24A and is attached to the floor portion of the recess portion 32. The fueling opening member 34 is attached to an upper end portion (a near side end portion) of the pipe main body 36. A lower end portion (a far side end portion) of the pipe main body 36 is connected to the fuel tank 22.

The fueling opening member 34 is attached to the floor portion of the recess portion 32 in a state in which the fueling opening member 34 is inserted through an attachment hole 32A formed in the floor portion of the recess portion 32. A near side end portion of the fueling opening member 34 (the upper end portion in FIG. 1 and FIG. 2) is disposed inside the recess portion 32. An annular projection portion 38 that projects to the diametric direction inner side is formed at the near side end portion of the fueling opening member 34. An aperture formed at the inner side of the projection portion 38 serves as the fueling opening 24A.

A substantially tubular tube portion 40 is formed at an axial direction intermediate portion of the fueling opening member 34 (in the vicinity of a central portion thereof in the present exemplary embodiment). The tube portion 40 is formed in a shape whose inner diameter gradually decreases from the near side toward the far side. An aperture 42 is formed at a far side end portion of the tube portion 40. The aperture 42 is formed with an opening diameter that is slightly larger than a nozzle diameter of the fueling nozzle 100. When the fueling nozzle 100 is inserted through the fueling opening 24A, the distal end portion of the fueling nozzle 100 comes into contact with an inner periphery face 40A of the tube portion 40 and is guided to the aperture 42 by the tube portion 40.

An annular sealing rubber 44 is attached to an opening edge of the aperture 42 of the tube portion 40 (in the present exemplary embodiment, to an end face at the far side of the tube portion 40), along the opening edge.

A first opening and closing unit 46, for opening and closing the aperture 42, is provided at the fueling opening member 34. The aperture 42 is closed off by a flapper valve 48 that structures the first opening and closing unit 46.

A second opening and closing unit 50 for opening and closing the fueling opening 24A is provided at the fueling opening member 34, at the near side relative to the first opening and closing unit 46. The fueling opening 24A is closed off by the outer side cover 28, which structures the second opening and closing unit 50.

Thus, the flow channel 26 inside the filler pipe 24 includes a first flow channel 26A from the outer side cover 28 to the flapper valve 48 and a second flow channel 26B from the flapper valve 48 to the fuel tank 22.

As shown in FIG. 2, the first opening and closing unit 46 is provided with the flapper valve 48, a support pin 52 and an urging spring 54. The flapper valve 48 is formed in a substantially circular flat plate shape with a larger diameter than the aperture 42 of the tube portion 40. In a state in which the flapper valve 48 is closed (hereinafter referred to as "the closed state" where appropriate), a near side face of the flapper valve 48 is in contact with the sealing rubber 44 and a seal is formed between the tube portion 40 and the flapper valve 48.

A pair of bearing portions 48A are provided at an end portion of the flapper valve 48. The support pin 52 is inserted into the bearing portions 48A and the support pin 52 pivotably supports the flapper valve 48. The support pin 52 is turnably supported by a pair of bearing portions 34A that are provided at the fueling opening member 34. Thus, the aperture 42 is opened and closed by the flapper valve 48 being pivoted about the support pin 52. The urging spring 54 is wound round the support pin 52 and the urging spring 54 urges the flapper valve 48 in the direction of closing. As an example, a torsional coil spring is used as the urging spring 54 according to the present exemplary embodiment. In this structure, when a force that is greater than the urging force of the urging spring 54 presses the flapper valve 48, the flapper valve 48 pivots about the support pin 52 in opposition to the urging force of the urging spring 54 and the aperture 42 is opened up.

The second opening and closing unit 50 is provided with the outer side cover 28, a support pin 56 and an urging spring 58. The outer side cover 28 is formed in a substantially circular flat plate shape with a larger diameter than the fueling opening 24A. The diameter of the outer side cover 28 is formed to be larger than the opening diameter of the fueling opening 24A. Thus, as shown in FIG. 2 and FIG. 3, in the state in which the outer side cover 28 is closed, an outer periphery edge portion of the outer side cover 28 is in contact with the opening edge of the fueling opening 24A.

A pair of bearing portions 28A are provided at an end portion of the outer side cover 28. The support pin 56 is inserted into the bearing portions 28A and the support pin 56 pivotably supports the outer side cover 28. The support pin 56 is pivotably supported by a pair of bearing portions, a bearing portion 34B and a bearing portion 34C, that are provided at the fueling opening member 34. Thus, the fueling opening 24A is opened and closed by the outer side cover 28 being pivoted about the support pin 56. The urging spring 58 is wound round the support pin 56 and the urging spring 58 urges the outer side cover 28 in the direction of closing. As an example, a torsional coil spring is used as the urging spring 58 according to the present exemplary embodiment. In this structure, when a force that is greater than the urging force of the urging spring 58 presses the outer side cover 28, the outer side cover 28 pivots about the support pin 56 in opposition to the urging force of the urging spring 58 and the fueling opening 24A is opened up.

Figure 3:
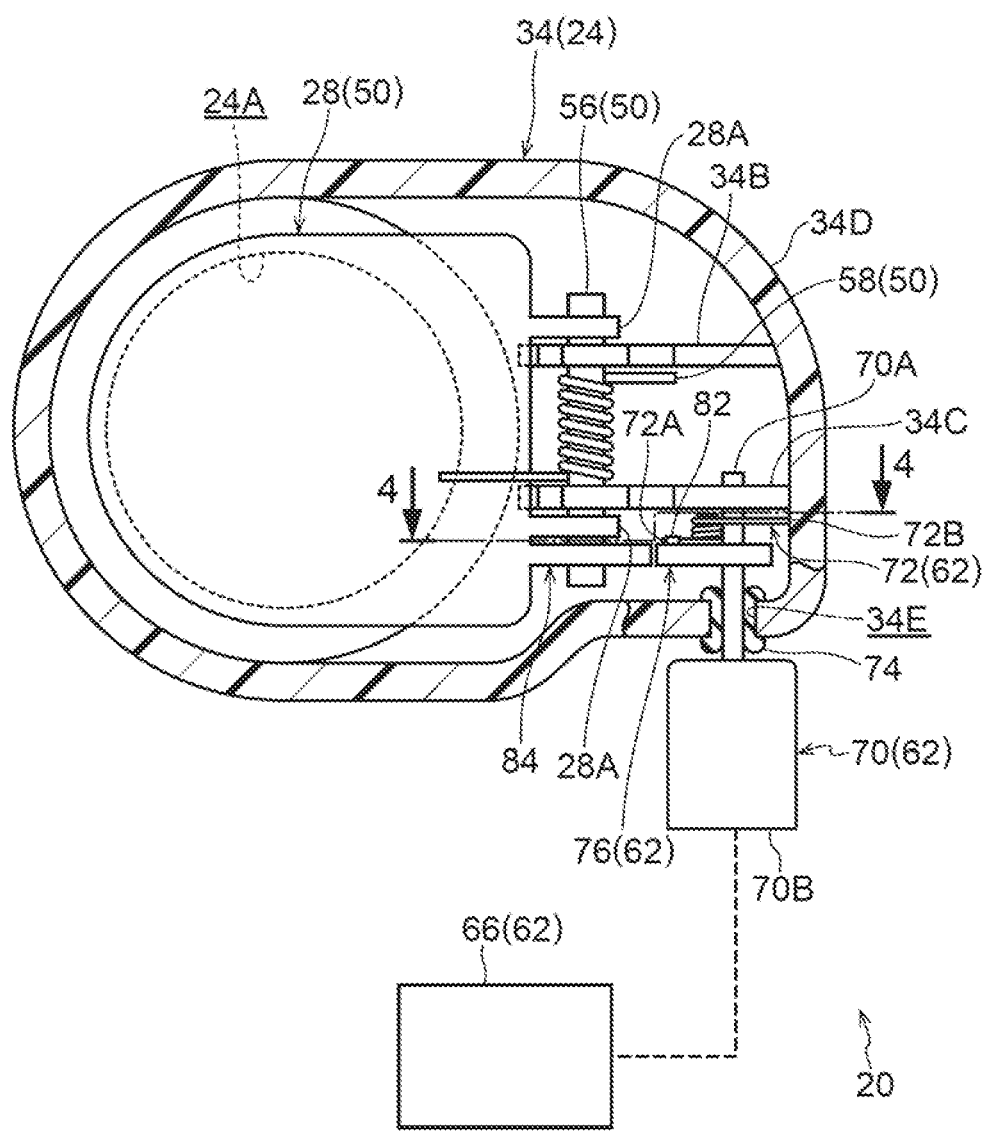
FIG. 3 is a sectional diagram in which the fueling pipe of FIG. 2 is cut along line 3-3.

As shown in FIG. 2, the fueling portion structure 20 according to the present exemplary embodiment is also provided with a fuel lid 60 and a valve retention device 62 (see FIG. 3). The fuel lid 60 is openably and closably provided at the outer panel of the vehicle body 30. In a closed state, the fuel lid 60 covers the fueling opening 24A from the vehicle body outer side thereof. The valve retention device 62 is provided inside the fueling opening member 34. The valve retention device 62 retains an open state of the outer side cover 28 in which the outer side cover 28 has been opened by pressing from the fueling nozzle 100. The valve retention device 62 releases the retention of the open state of the outer side cover 28 when the fuel lid 60 goes into the closed state thereof. The fuel lid 60 according to the present exemplary embodiment is an example of a lid of the present invention, and the valve retention device 62 according to the present exemplary embodiment is an example of a valve retention device of the present invention.

As illustrated in FIG. 1 and FIG. 2, the fuel lid 60 is structured to be opened by an opening operation of a lid opening switch, not shown in the drawings, that is disposed inside the vehicle cabin. A lid opening/closing sensor 64 is provided in the recess portion 32. The lid opening/closing sensor 64 senses opening and closing of the fuel lid 60. Opening/closing information sensed by the lid opening/closing sensor 64 is sent to a control device 66, which is described below. In the present exemplary embodiment, an engine control unit (hereinafter referred to simply as "the ECU") is used as the control device 66.

As shown in FIG. 4 to FIG. 8, the valve retention device 62 is provided with a retention member 76, which is described below, a servo motor 70, the control device 66, and an urging spring 72. The retention member 76 is provided with a valve retention portion 68. The valve retention portion 68 abuts against an abutting portion 88 of a turning member 84, which is described below, of the outer side cover 28 when the outer side cover 28 has been opened, retaining the open state of the outer side cover 28. The servo motor 70 moves the valve retention portion 68 from an abutting position at which the valve retention portion 68 abuts against the abutting portion 88 of the outer side cover 28 (for example, the position shown in FIG. 7) to a withdrawn position at which the valve retention portion 68 does not abut against the abutting portion 88 of the outer side cover 28 (for example, the position shown in FIG. 8). The control device 66 controls the servo motor 70 to move the valve retention portion 68 toward the withdrawn position when the fuel lid 60 is put into the closed state thereof. The urging spring 72 urges the valve retention portion 68 toward the abutting position.

The valve retention portion 68 according to the present exemplary embodiment is an example of a valve retention portion of the present invention, the servo motor 70 according to the present exemplary embodiment is an example of a movement device of the present invention, the urging spring 72 according to the present exemplary embodiment is an example of an urging member of the present invention, and the control device 66 according to the present exemplary embodiment is an example of a control device of the present invention.

The present exemplary embodiment has a structure in which operations of the servo motor 70 are controlled by the control device 66. However the present invention is not limited by this structure. For example, a structure is possible in which a dedicated control device is provided separately from the control device 66 that is the ECU to control operations of the servo motor 70.

A penetrating hole 34E (see FIG. 3) is formed at a periphery wall portion 34D of the fueling opening member 34. The penetrating hole 34E is formed between the projection portion 38 and the tube portion 40, at the opposite side of the support pin 56 from the side thereof at which the fueling opening 24A is provided. As shown in FIG. 3, an annular sealing member 74 is attached to the penetrating hole 34E. The sealing member 74 is formed in a "U" shape in cross section, so as to sandwich a hole edge portion of the penetrating hole 34E.

A motor spindle 70A of the servo motor 70 is inserted at the inner side of the sealing member 74. The motor spindle 70A extends as far as the bearing portion 34C. A distal end portion of the motor spindle 70A is rotatably supported by the bearing portion 34C. A motor main body 70B of the servo motor 70 is attached to the outer side of the filler pipe 24, via a bracket that is not shown in the drawings. In the present exemplary embodiment, as shown in FIG. 3 and FIG. 4, the support pin 56 and the servo motor 70 are disposed to be parallel.

As shown in FIG. 3, the retention member 76, in a plate shape, is attached to the motor spindle 70A between the bearing portion 34C and the sealing member 74. The retention member 76 according to the present exemplary embodiment is an example of a retention member of the present invention.

Figure 4:
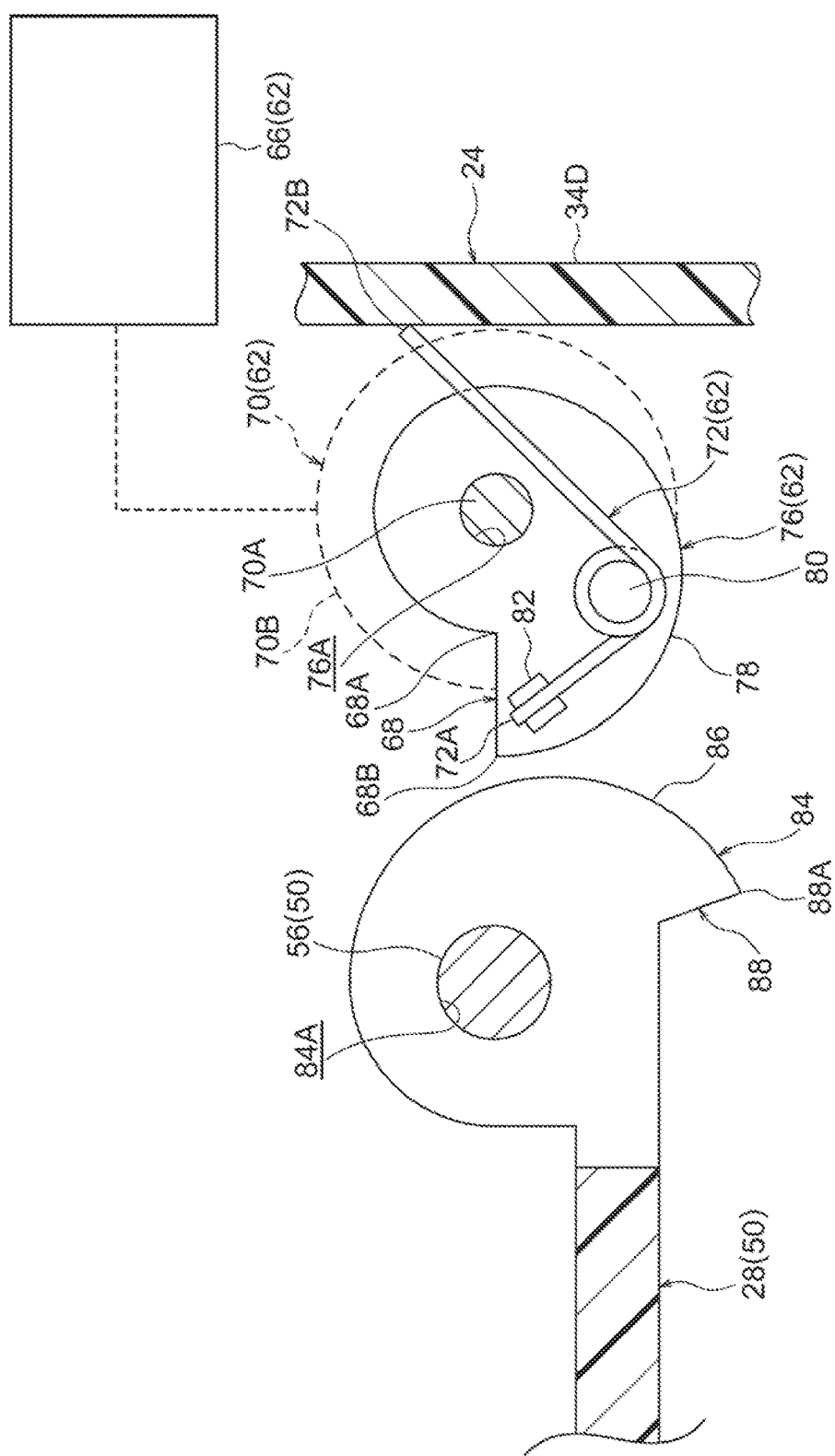
FIG. 4 is a sectional diagram in which the fueling pipe of FIG. 3 is cut along line 4-4, showing a closed state of an on-off valve.

As shown in FIG. 4, a penetrating hole 76A is formed in the retention member 76. The motor spindle 70A is fitted into the penetrating hole 76A. The external shape of the retention member 76 is provided with a linear portion and a curved portion 78. The linear portion extends along the diametric direction of the penetrating hole 76A, at the side of the penetrating hole 76A at which the outer side cover 28 is disposed (in FIG. 4, the linear portion extends to the left side). The curved portion 78 extends continuously so as to encircle the penetrating hole 76A, from one end 68A of the linear portion, at the side thereof at which the penetrating hole 76A is disposed, to another end 68B of the linear portion. In the present exemplary embodiment, the linear portion of the retention member 76 structures the valve retention portion 68. That is, the valve retention portion 68 is provided at the retention member 76.

Figure 5:
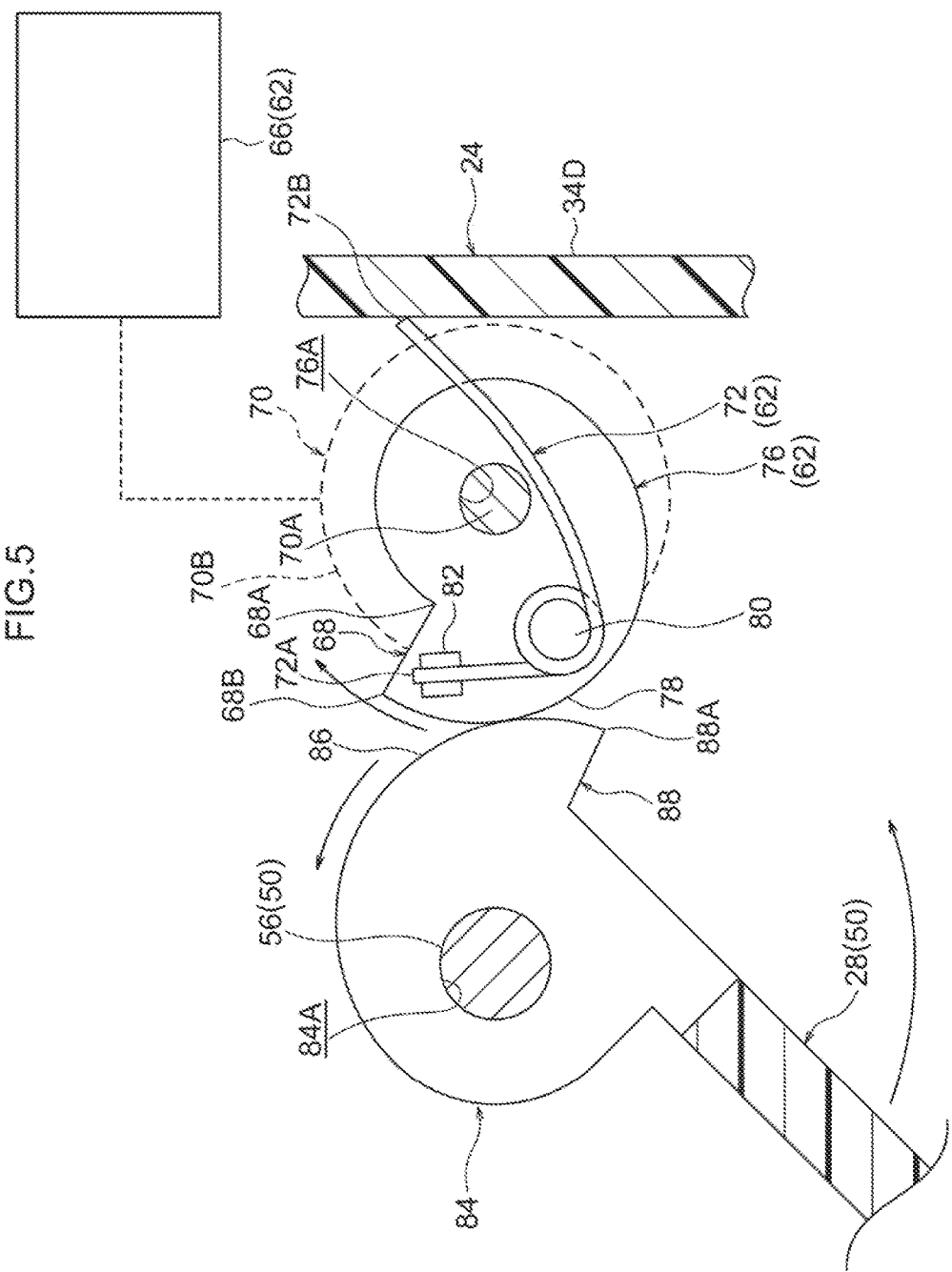
FIG. 5 is a sectional diagram corresponding to FIG. 4, showing a state in which a retention member that abuts against the on-off valve is turning during an opening operation.
Figure 8:
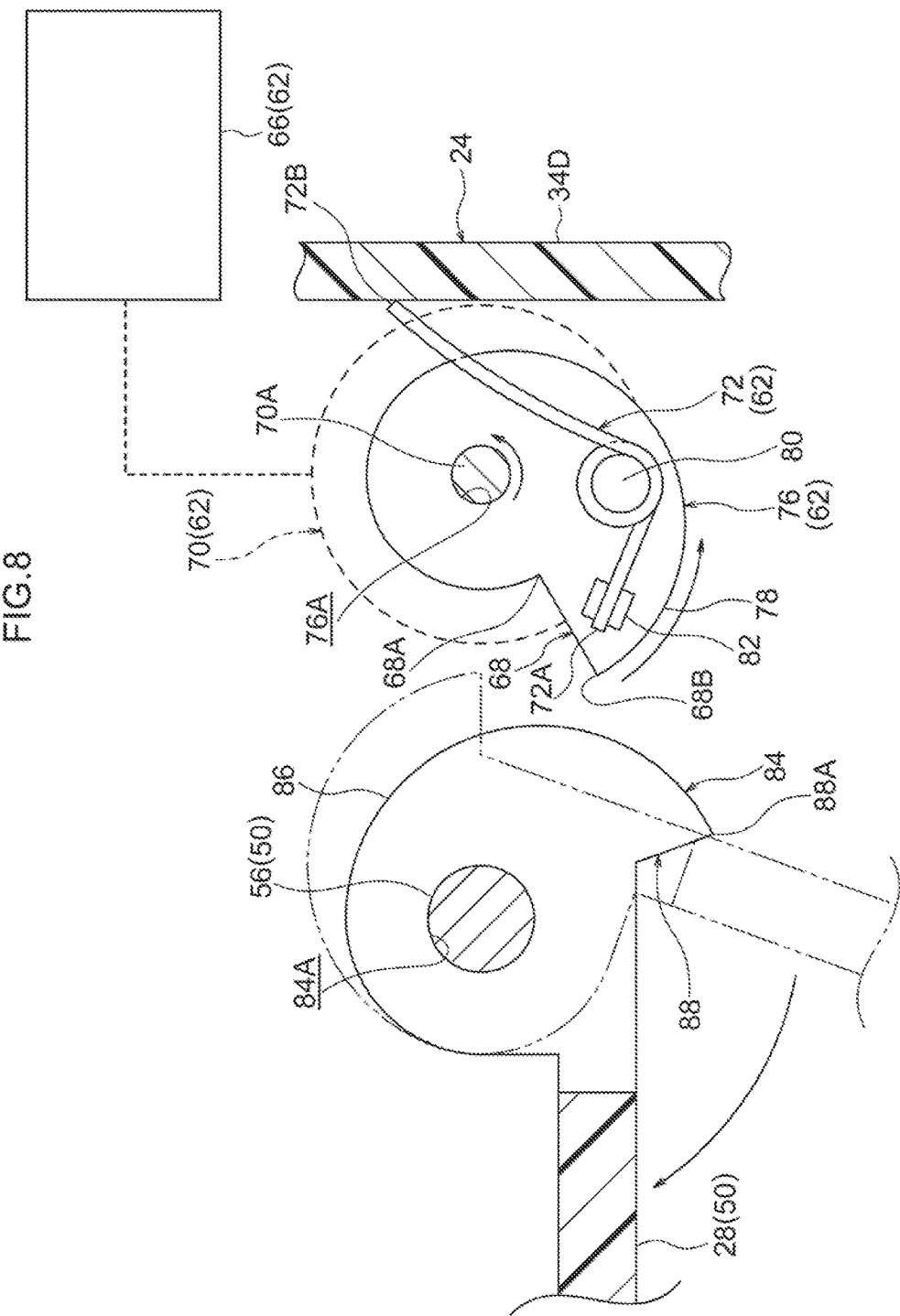
FIG. 8 is a sectional diagram corresponding to FIG. 4, showing a state in which the retention of the on-off valve in the open state by the valve retention device has been released.

A circular rod-shaped protrusion 80 is also provided at the retention member 76. The protrusion 80 protrudes from a face of the retention member 76 at the side thereof at which the bearing portion 34C is disposed. The urging spring 72 is wound round the protrusion 80. In the present exemplary embodiment, as an example, a torsional coil spring is used as the urging spring 72. One end 72A of the urging spring 72 is attached to an attachment portion 82 of the retention member 76, and another end 72B of the urging spring 72 is fixed to the periphery wall portion 34D. An attachment position of the one end 72A to the retention member 76 is adjusted such that the urging spring 72 is in an unloaded state when the valve retention portion 68 is at the abutting position. Thus, when the valve retention portion 68 is at a position that is displaced from the abutting position, as shown in FIG. 5, FIG. 8 and the like, the retention member 76 is subject to a force from the urging spring 72 in the direction in which the valve retention portion 68 returns to the abutting position.

As shown in FIG. 3, the turning member 84 is provided in a plate shape at the outer side cover 28. The turning member 84 is provided at a position that is at the outer side relative to the bearing portions 28A and that corresponds with the retention member 76. A penetrating hole 84A is formed in the turning member 84. The support pin 56 is inserted through the penetrating hole 84A. As shown in FIG. 4, the external shape of the turning member 84 is provided with a linear portion and a curved portion 86. The linear portion extends along the diametric direction of the penetrating hole 84A, at the far side relative to the penetrating hole 84A (in FIG. 4, the linear portion extends diagonally to the lower-right side). The curved portion 86 extends continuously so as to encircle the penetrating hole 84A, from an end portion 88A of the linear portion at the opposite side thereof from the side at which the penetrating hole 84A is disposed. In the present exemplary embodiment, the linear portion of the turning member 84 structures the abutting portion 88 that abuts against the valve retention portion 68.

Figure 6:
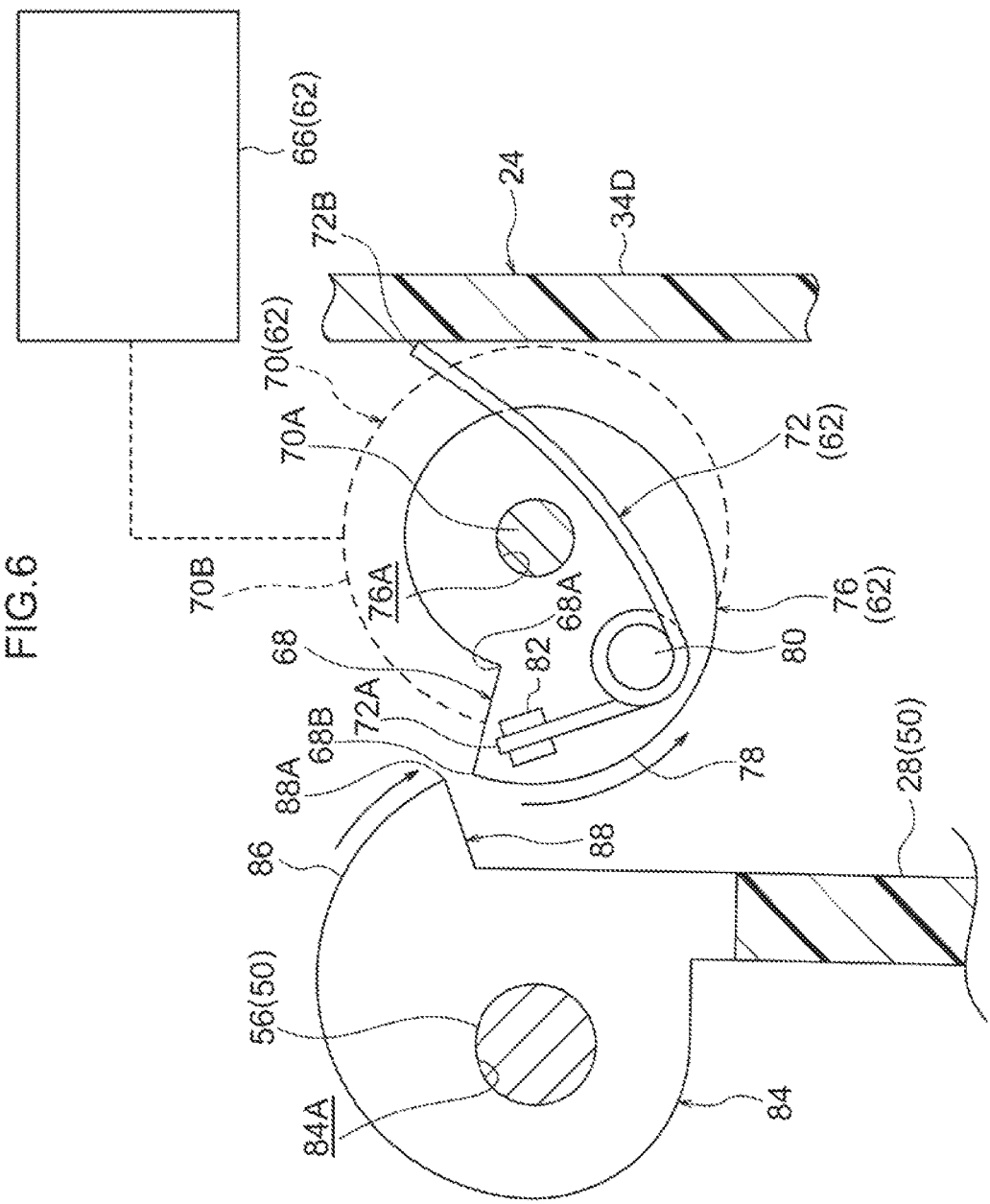
FIG. 6 is a sectional diagram corresponding to FIG. 4, showing a state during the opening operation in which a gap is formed between the retention member and the on-off valve and the retention member is turning in a direction of returning a valve retention portion to an abutting position.

As shown in FIG. 4, the radius of curvature of the curved portion 86 (i.e., distances from the center of the penetrating hole 84A) increases toward the end portion 88A of the abutting portion 88. Therefore, when the outer side cover 28 is in the closed state thereof, the curved portion 86 does not abut against the curved portion 78 of the retention member 76 that is at the abutting position, but when the outer side cover 28 is performing the opening operation thereof, the side of the curved portion 86 at which the end portion 88A of the abutting portion 88 is disposed abuts against the curved portion 78 of the retention member 76 and turns the retention member 76 together with the curved portion 86 (in FIG. 5, the turning member 84 is turning in the counterclockwise direction and the retention member 76 is turning in the clockwise direction). As shown in FIG. 6, when the outer side cover 28 is put into the open state by the fueling nozzle 100, the end portion 88A of the abutting portion 88 of the turning member 84 passes over the another end 68B of the valve retention portion 68 of the retention member 76. Consequently, a gap is formed between the retention member 76 and the turning member 84, the retention member 76 is turned by the urging force of the urging spring 72, and the valve retention portion 68 returns to the abutting position. Subsequently, when the fueling nozzle 100 is pulled out, although the outer side cover 28 is urged to return to the closed position thereof by the urging force of the urging spring 58, the abutting portion 88 of the turning member 84 abuts against the valve retention portion 68 of the retention member 76, and the open state of the outer side cover 28 is retained (see FIG. 7). In the present exemplary embodiment, the urging force of the urging spring 72 is specified to be at least that of the urging spring 58.

Figure 7:
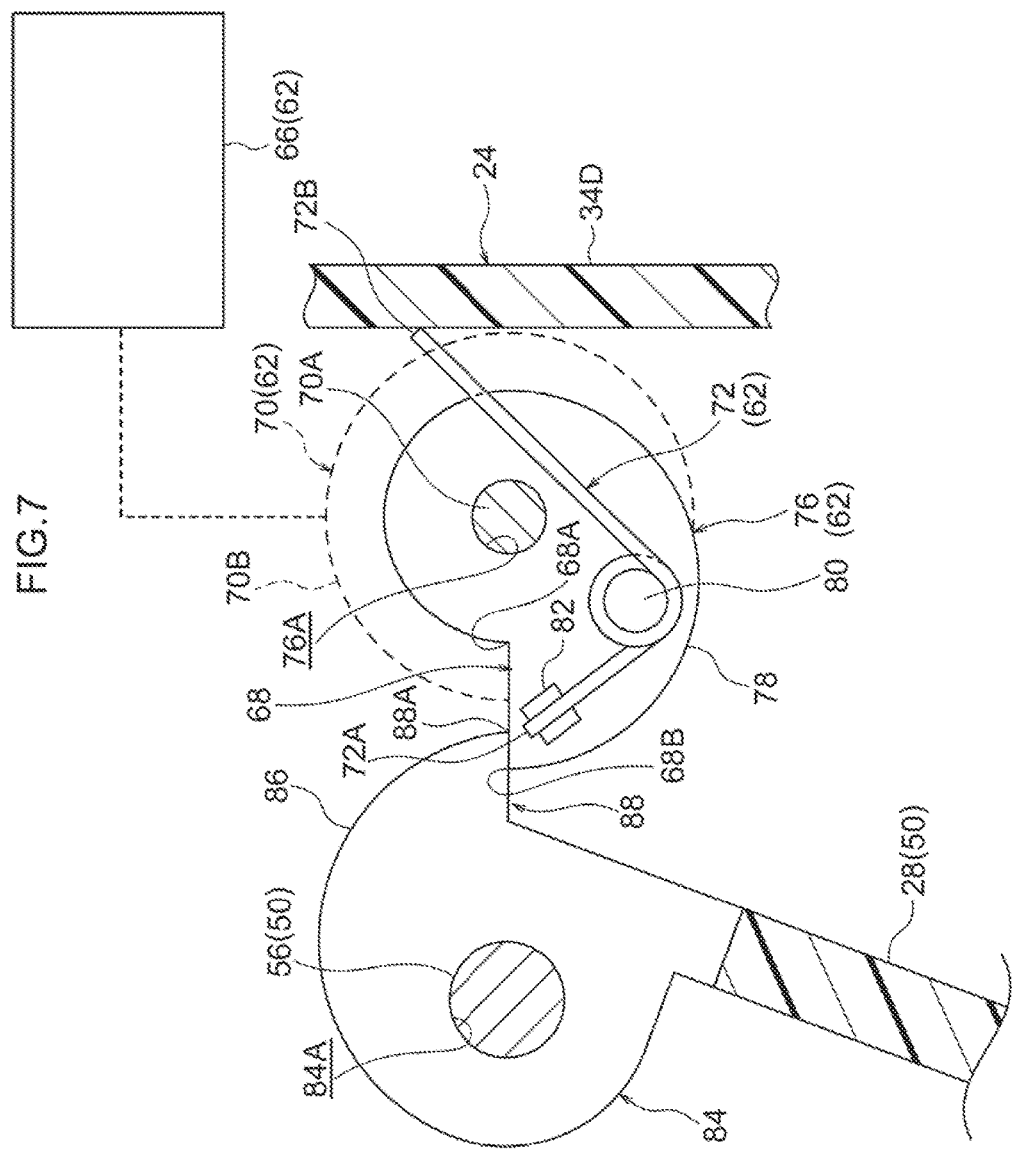
FIG. 7 is a sectional diagram corresponding to FIG. 4, showing a state in which an open state of the on-off valve is retained by a valve retention device.

As indicated in FIG. 4, the servo motor 70 is controlled by the control device 66. The servo motor 70 may turn the motor spindle 70A and move the valve retention portion 68 provided at the retention member 76 from the abutting position to the withdrawn position. In specific terms, if the open state of the outer side cover 28 is retained as shown in FIG. 7, then when the retention member 76 is turned as shown in FIG. 8 in the opposite direction to the direction of turning together with the turning member 84 (in FIG. 8, the retention member 76 is being turned in the counterclockwise direction) and the valve retention portion 68 is moved from the abutting position to the withdrawn position, the outer side cover 28 is returned to the closed state by the urging force of the urging spring 58.

Figure 9:
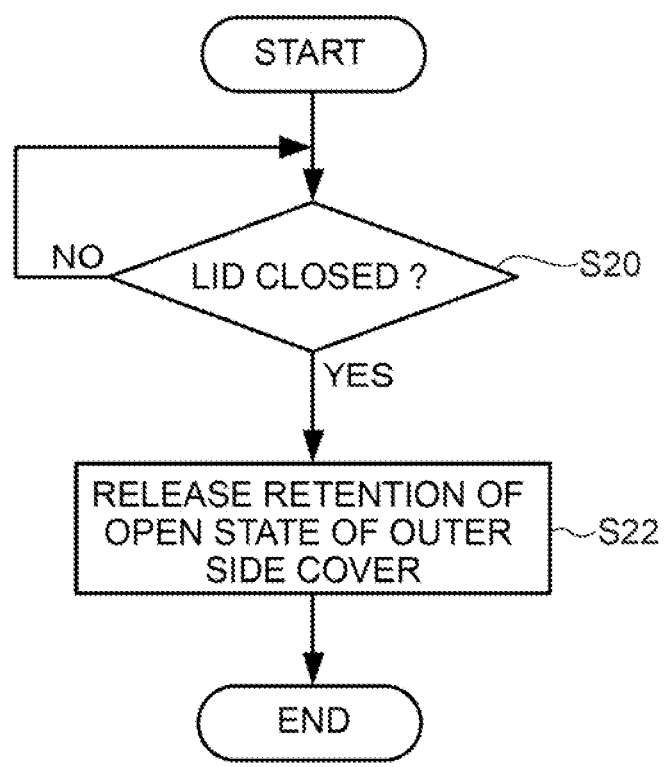
FIG. 9 is a flowchart representing a retention releasing operation of the valve retention device in accordance with the first exemplary embodiment.

FIG. 9 is a flowchart showing an example of operation of the valve retention device 62 of the fueling portion structure 20 according to the present exemplary embodiment at a time of fueling.

In step S20, the lid opening/closing sensor 64 sends opening/closing information about the fuel lid 60 to the control device 66. At the control device 66, if the opening/closing information sent from the lid opening/closing sensor 64 is information representing the closed state of the fuel lid 60, the control device 66 proceeds to step S22. If the opening/closing information is information representing the open state of the fuel lid 60, the control device 66 repeats step S20.

In step S22, the control device 66 operates the servo motor 70 to move the valve retention portion 68 from the abutting position to the withdrawn position, releasing the retention of the open state of the outer side cover 28. As a result, as shown in FIG. 8, the outer side cover 28 returns to the closed state and the fueling opening 24A is closed off.

Now, operational effects of the fueling portion structure 20 according to the present exemplary embodiment are described.

At the fueling portion structure 20, after the fuel lid 60 is opened, when the fueling nozzle 100 is inserted through the fueling opening 24A and presses against the outer side cover 28, the flow channel 26 inside the filler pipe 24 is opened up and fueling into the fuel tank 22 is enabled.

When fueling has been finished and the fueling nozzle 100 is pulled out from the filler pipe 24, the abutting portion 88 abuts against the valve retention portion 68, retaining the open state of the outer side cover 28 (see FIG. 7). Then, when the fuel lid 60 goes into the closed state thereof, the control device 66 operates the servo motor 70, moving the valve retention portion 68 from the abutting position to the withdrawn position, and the retention of the open state of the outer side cover 28 is released. As a result, as shown in FIG. 8, the outer side cover 28 returns to the closed state and the fueling opening 24A is closed off.

In this fueling portion structure 20, as shown in FIG. 7, the open state of the outer side cover 28 is retained by the valve retention device 62 until the fuel lid 60 goes into the closed state thereof. Therefore, even if fuel falls when the fueling nozzle 100 is being pulled out, the fuel is unlikely to collect on the outer side cover 28.

Moreover, in the fueling portion structure 20, the retention of the open state of the outer side cover 28 may be released by a simple structure in which the servo motor 70 is controlled by the control device 66 and moves the valve retention portion 68.

As shown in FIG. 7, in the fueling portion structure 20, the valve retention portion 68 is urged toward the abutting position by the urging spring 72. Therefore, the open state of the outer side cover 28 may be retained reliably.

In the fueling portion structure 20, a duration in which the valve retention portion 68 moves from the abutting position to the withdrawn position may be adjusted by adjustment of a rotary speed of the motor spindle 70A of the servo motor 70. Thus, the duration in which the outer side cover 28 returns from the open state to the closed state may be adjusted. Therefore, even if a distal end of the fueling nozzle 100 is touched against the fueling opening 24A and fuel drains out, because a duration for the drained fuel to pass down through the fueling opening 24A may be assured, the fuel is less likely to collect on the outer side cover 28 than in, for example, a structure in which a duration in which the outer side cover 28 returns from the open state to the closed state cannot be adjusted.

Second Exemplary Embodiment

Now, a fueling portion structure 90 according to a second exemplary embodiment of the present invention is described with reference to FIG. 10 to FIG. 12. Structures that are the same as in the first exemplary embodiment are assigned the same reference numerals and descriptions thereof are omitted as appropriate.

Figure 10:
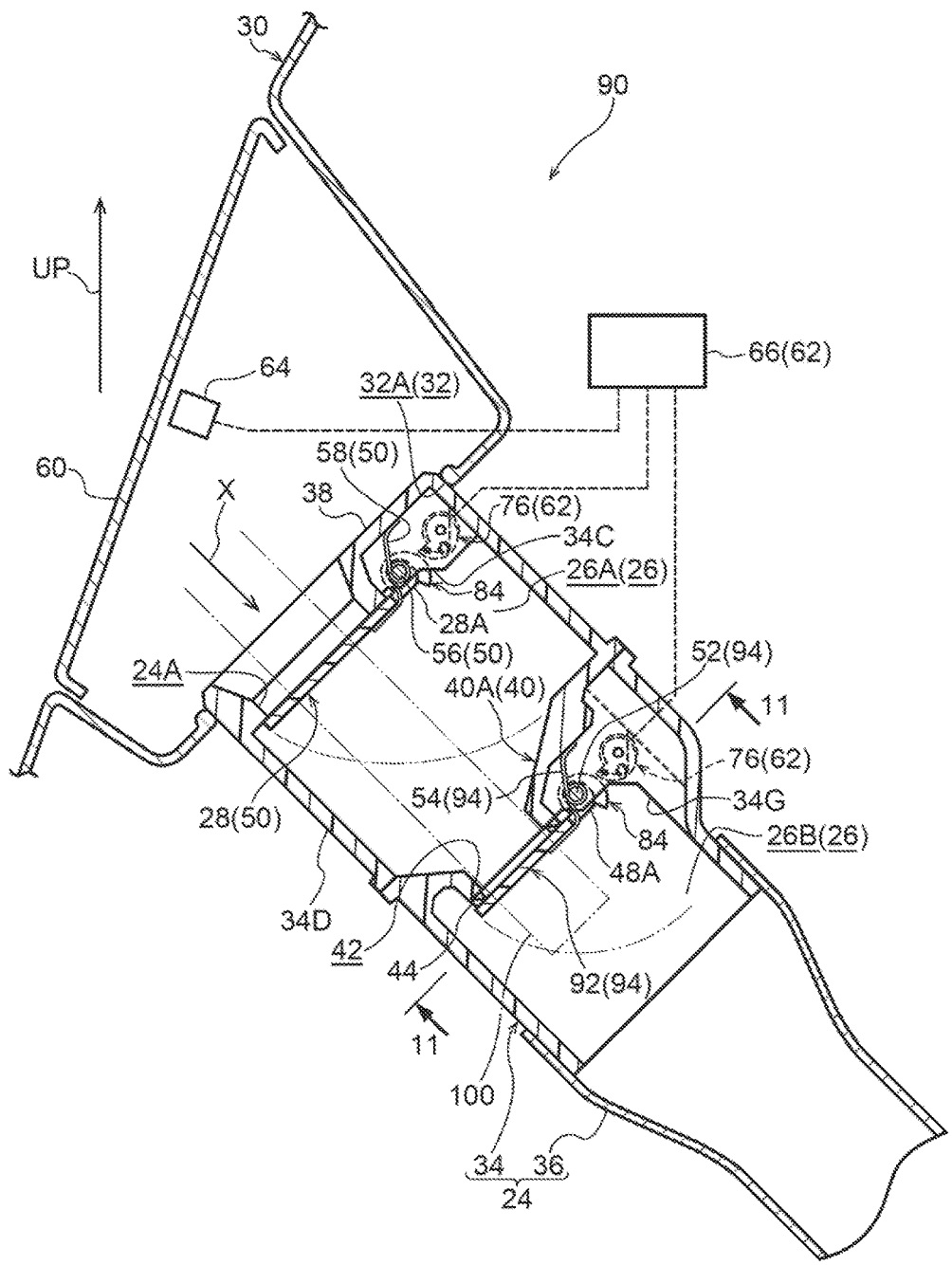
FIG. 10 is a sectional diagram cut along an axial direction of a fueling pipe that is used at a fuel tank fueling portion structure in accordance with a second exemplary embodiment.

As shown in FIG. 10, in contrast to the fueling portion structure 20 according to the first exemplary embodiment, two of the valve retention device 62 are provided in the fueling portion structure 90, so as to retain the open state of the outer side cover 28 and to retain an open state of a flapper valve 92. In specific terms, as shown in FIG. 11, at the valve retention device 62 that implements the retention and release of retention of the open state of the flapper valve 92, the motor spindle 70A of another of the servo motor 70 is inserted through the inner side of another of the sealing member 74, which is attached at a penetrating hole 34F formed in the fueling opening member 34, and a distal end portion of the motor spindle 70A is rotatably supported by a bearing portion 34G. In the present exemplary embodiment, the support pin 52 and motor spindle 70A thereat are disposed to be parallel. The two servo motors 70 of the valve retention devices 62 are respectively controlled by the control device 66. As shown in FIG. 12, when the fuel lid 60 goes into the closed state thereof at step S90, the control device 66 proceeds to step S92, releases the retention of the open state of the outer side cover 28 and releases the retention of the flapper valve 92.

Figure 11:
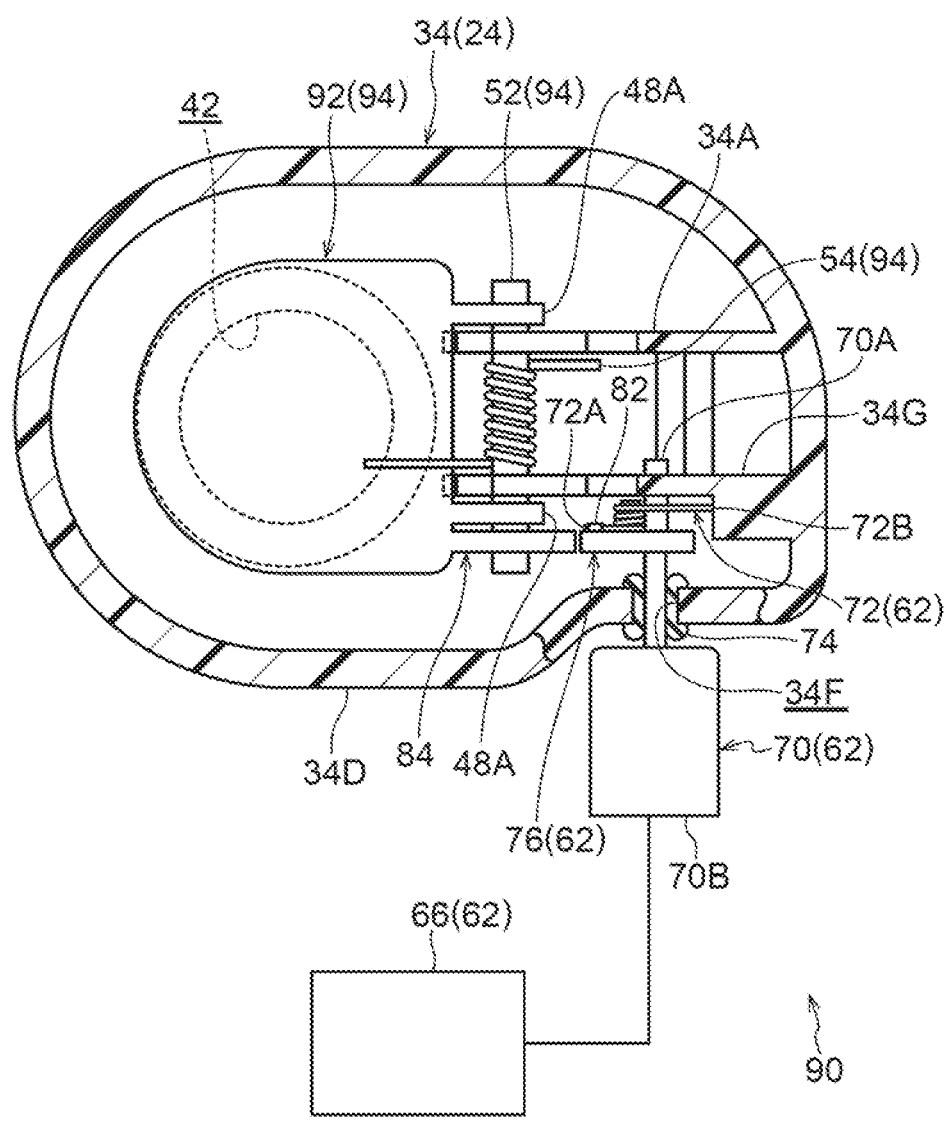
FIG. 11 is a sectional diagram in which the fueling pipe of FIG. 10 is cut along line 11-11.
Figure 12:
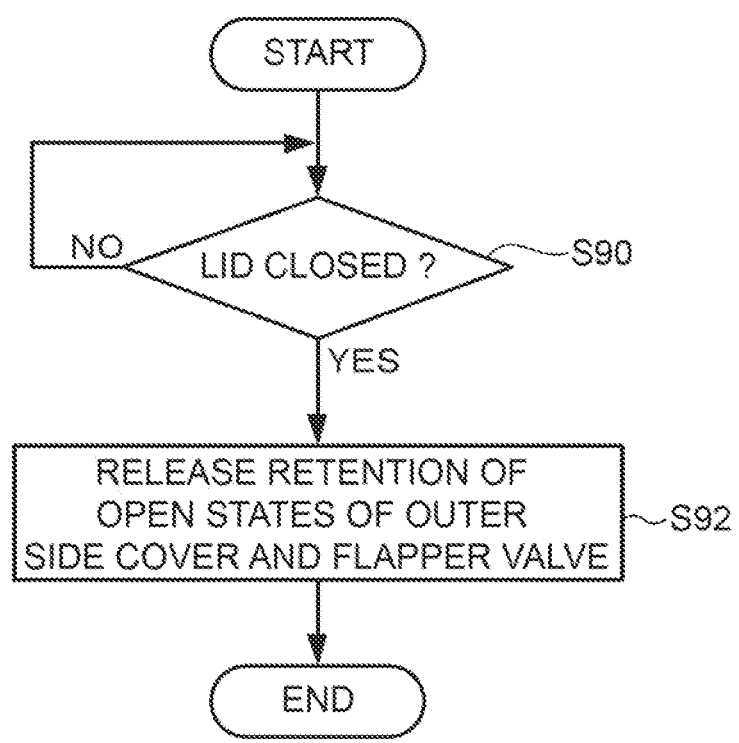
FIG. 12 is a flowchart representing a retention releasing operation of a valve retention device in accordance with the second exemplary embodiment.

As shown in FIG. 10 and FIG. 11, another of the turning member 84 is provided at the flapper valve 92, in a plate shape the same as that of the first exemplary embodiment. This turning member 84 is provided at a position that is at the outer side relative to the bearing portions 48A and that corresponds with the retention member 76. The flapper valve 92 has the same structure as the flapper valve 48 according to the first exemplary embodiment, except that the turning member 84 that abuts against the retention member 76 is provided. A first opening and closing portion 94 according to the present exemplary embodiment is provided with the flapper valve 92, another of the support pin 52 and another of the urging spring 54. The support pin 52 is supported by the bearing portions 34A and the bearing portion 34G. The outer side cover 28 and the flapper valve 92 according to the present exemplary embodiment respectively correspond to examples of the on-off valve of the present invention.

Now, operational effects of the fueling portion structure 90 according to the present exemplary embodiment are described. Operational effects provided by structures that are the same as in the fueling portion structure 20 according to the first exemplary embodiment are not described.

In the fueling portion structure 90, in contrast to the fueling portion structure 20 according to the first exemplary embodiment, retention of the open state of the outer side cover 28 and retention of the open state of the flapper valve 92 are implemented by, respectively, the two valve retention devices 62. Therefore, fuel that falls from the fueling nozzle 100 when the fueling nozzle 100 is pulled out may pass through the interior of the filler pipe 24 to the fuel tank 22.

In the present exemplary embodiment, closing start times of the outer side cover 28 and the flapper valve 92 after the fuel lid 60 has closed are not particularly limited. It is acceptable for the starting times of the closing operations of the outer side cover 28 and the flapper valve 92 to be simultaneous or for one to be earlier.

Third Exemplary Embodiment

Now, a fueling portion structure 110 according to a third exemplary embodiment of the present invention is described with reference to FIG. 13 and FIG. 14. Structures that are the same as in the second exemplary embodiment are assigned the same reference numerals and descriptions thereof are omitted as appropriate.

Figure 13:
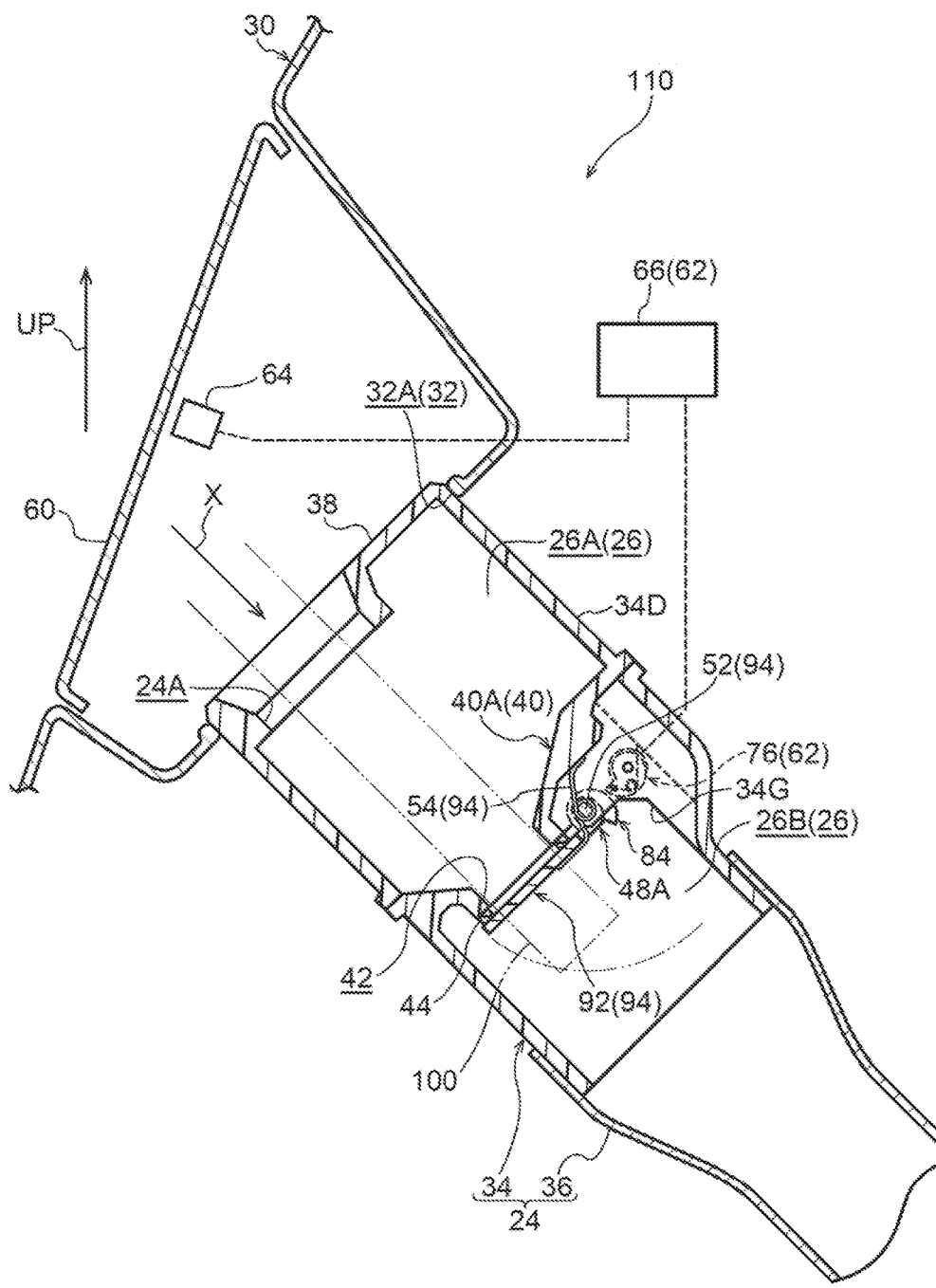
FIG. 13 is a sectional diagram cut along an axial direction of a fueling pipe that is used at a fuel tank fueling portion structure in accordance with a third exemplary embodiment.
Figure 14:
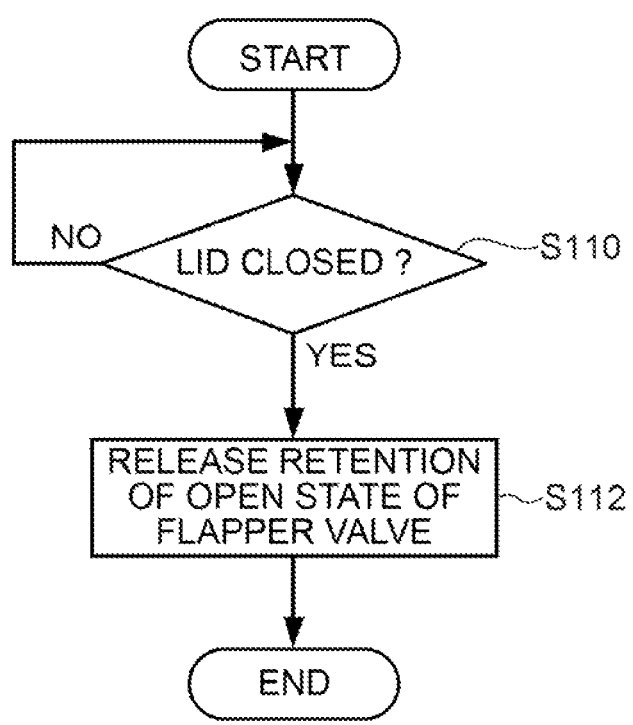
FIG. 14 is a flowchart representing a retention releasing operation of a valve retention device in accordance with the third exemplary embodiment.

As shown in FIG. 13, in the fueling portion structure 110, in contrast to the fueling portion structure 90 according to the second exemplary embodiment, the second opening and closing unit 50 including the outer side cover 28 is not provided in the filler pipe 24; only the first opening and closing portion 94 including the flapper valve 92 is provided. Therefore, as shown in FIG. 14, in the fueling portion structure 110, when the fuel lid 60 goes into the closed state thereof at step S110, the control device 66 proceeds to step S112 and releases the retention of the open state of the flapper valve 92.

Now, operational effects of the fueling portion structure 110 according to the present exemplary embodiment are described. Operational effects provided by structures that are the same as in the fueling portion structure 20 according to the first exemplary embodiment are not described.

In the fueling portion structure 110, because the second opening and closing unit 50 is not provided, components for structuring the second opening and closing unit 50 may be omitted. Furthermore, the structure of the fueling opening member 34 may be simplified.

The first exemplary embodiment has a structure in which the urging spring 72 and the servo motor 70 are used to turn the retention member 76 and move the valve retention portion 68 between the abutting position and the withdrawn position, but the present invention is not limited to this structure. For example, a structure is possible in which a sensor that detects a state in which the fueling nozzle 100 has been inserted through the fueling opening 24A is provided (for example, the inserted state of the fueling nozzle 100 is detected by a sensor that detects an opening angle of the outer side cover 28), and the servo motor 70 is used to turn the retention member 76 to move the valve retention portion 68 to the abutting position and retain the open state of the outer side cover 28 when the fueling nozzle 100 is in the inserted state. In this case, even if the urging spring 72 is not provided at the valve retention device 62, the valve retention portion 68 may be moved between the abutting position and the withdrawn position by the servo motor 70 alone. Therefore, the mechanism that moves the valve retention portion 68 may be simplified. The structure of the valve retention device 62 in which the valve retention portion 68 is moved between the abutting position and the withdrawn position by the servo motor 70 alone is also applicable to both the second exemplary embodiment and the third exemplary embodiment.

The first exemplary embodiment has a structure in which the motor spindle 70A of the servo motor 70 is rotated to move the valve retention portion 68 to turn from the abutting position to the withdrawn position, but the present invention is not limited to this structure. For example, a structure is possible in which an actuator that reciprocatingly translates a rod is used to move a valve retention portion linearly between an abutting position and a withdrawn position. Further, a structure may be formed in which a retention member at which a valve retention portion is provided can be temporarily withdrawn by the curved portion 86 of the turning member 84 when the outer side cover 28 goes through the opening operation thereof (for example, a structure in which a coil spring is disposed between a distal end of a rod and the retention member). Thus, similar operational effects to the valve retention device 62 according to the first exemplary embodiment may be obtained. The above structures in which an actuator is used to move a valve retention portion linearly between an abutting position and a withdrawn position are also applicable to both the second exemplary embodiment and the third exemplary embodiment.

Hereabove, exemplary embodiments of the present invention have been described. The present invention is not limited by these descriptions, and it will be clear that numerous modifications outside of these descriptions may be embodied within a technical scope not departing from the spirit of the invention.

All references, patent applications and technical specifications cited in the present specification are incorporated by reference into the present specification to the same extent as if the individual references, patent applications and technical specifications were specifically and individually recited as being incorporated by reference.

What is claimed is:

1. A fuel tank fueling portion structure comprising:
   a fueling pipe that is in fluid communication with a fuel tank, the fueling pipe being provided with a fueling opening at which a fueling nozzle can be inserted;
   a lid that is openably and closably provided at a vehicle body, the lid in a closed state covering the fueling opening from a vehicle body outer side;
   an on-off valve that is provided at a flow channel inside the fueling pipe and closes off the flow channel, the on-off valve opening up the flow channel when pressed by the fueling nozzle, the on-off valve being provided with an abutting portion; and
   a valve retention device that is provided in the fueling pipe, the valve retention device retaining an open state of the on-off valve that has been opened by pressing from the fueling nozzle, and releasing the retention of the open state of the on-off valve when the lid goes into a closed state,
   wherein the valve retention device includes:
      a retention member provided with a valve retention portion that abuts against the abutting portion of the opened on-off valve and retains the open state of the on-off valve;
      a movement device that moves the valve retention portion from an abutting position, at which the valve retention portion abuts against the on-off valve, toward a withdrawn position, at which the valve retention portion does not abut against the on-off valve; and
      a control device that controls the movement device and moves the valve retention portion toward the withdrawn position when the lid goes into the closed state.

2. The fuel tank fueling portion structure according to claim 1, wherein the valve retention device further includes an urging member that urges the valve retention portion toward the abutting position.

3. The fuel tank fueling portion structure according to claim 1, wherein: the retention member is turnably supported by the movement device, and the movement device turns the retention member and moves the valve retention portion from the abutting position toward the withdrawn position.

* * * * *